(12) United States Patent
Gopalan

(10) Patent No.: US 7,814,014 B2
(45) Date of Patent: Oct. 12, 2010

(54) PROVIDING DUAL NUMBER ACCESS ELECTRONIC WALLET

(75) Inventor: Prabhakar Gopalan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2350 days.

(21) Appl. No.: 09/888,470

(22) Filed: Jun. 25, 2001

(65) Prior Publication Data

US 2003/0009422 A1    Jan. 9, 2003

(51) Int. Cl.
G06Q 40/00    (2006.01)
(52) U.S. Cl. .................................................. 705/41
(58) Field of Classification Search .............. 705/35–40
See application file for complete search history.

(56) References Cited

U.S. PATENT DOCUMENTS

| | | | | |
|---|---|---|---|---|
| 4,341,951 | A | | 7/1982 | Benton ......................... 235/379 |
| 4,852,165 | A | * | 7/1989 | Copella et al. ................. 705/72 |
| 5,578,808 | A | | 11/1996 | Taylor ......................... 235/380 |
| 5,744,787 | A | * | 4/1998 | Teicher ......................... 235/380 |
| 6,018,724 | A | * | 1/2000 | Arent ........................... 705/44 |
| 6,061,665 | A | | 5/2000 | Bahreman ...................... 705/40 |
| 6,078,902 | A | | 6/2000 | Schenkler ...................... 705/35 |
| 6,236,981 | B1 | * | 5/2001 | Hill .............................. 705/67 |
| 6,807,530 | B1 | * | 10/2004 | Shub et al. ..................... 705/1 |
| 6,957,199 | B1 | * | 10/2005 | Fisher .......................... 705/78 |
| 2001/0034720 | A1 | * | 10/2001 | Armes .......................... 705/65 |
| 2001/0034725 | A1 | * | 10/2001 | Park et al. ...................... 705/79 |
| 2002/0065774 | A1 | * | 5/2002 | Young et al. ................... 705/41 |

OTHER PUBLICATIONS

PR Newswire, "Microsoft Passport offers streamlined purchasing across leading website", New York, Oct. 11, 1999, p. 1.*
PR Newswire, "ezlogin.com annouces first 'instant checkout' service for online shopping" New York: Sep. 15, 1999, p. 1.*

* cited by examiner

Primary Examiner—Olabode Akintola
(74) Attorney, Agent, or Firm—Yee & Associates, P.C.; William H. Steinberg; Rudolf O. Siegesmund

(57) ABSTRACT

An electronic wallet is based upon a centralized personal data base (CPDB). In the CPDB system merchants obtained customer information by using a primary number and a secondary number given to them by the customer. The CPDB electronic wallet provides a primary number and a wallet number to the merchant to conduct the financial transaction between the user and the merchant. The merchant submits the primary number and the wallet number to the centralized personal data base, the transaction is processed by the CPDB, and the merchant obtains credit for the financial transaction.

1 Claim, 4 Drawing Sheets

US 7,814,014 B2

PROVIDING DUAL NUMBER ACCESS ELECTRONIC WALLET

FIELD OF THE INVENTION

The present invention relates to a centralized personal data bank and an electronic wallet tied to the centralized personal data bank that can be used for purchases over the telephone or over the Internet based upon a primary number and a wallet number.

BACKGROUND OF THE INVENTION

A centralized personal data base (CPDB) system for merchant access of customer information was disclosed in application Ser. No. 09/888,452. In the CPDB system merchants obtained customer information by using a primary number and a secondary number given to them by the customer. A need exists for a centralized data base and electronic wallet that will allow users to purchase products online or over the phone in a secure and simplified process.

SUMMARY OF THE INVENTION

The invention which meets the needs identified above is an electronic wallet based upon the centralized personal data base (CPDB) system disclosed in application Ser. No. 09/888, 452. In the CPDB system merchants obtained customer information by using a primary number and a secondary number given to them by the customer. The CPDB electronic wallet user need only provide the primary number and the wallet number to the merchant to conduct a financial transaction between the user and the merchant. The merchant submits the primary number and the wallet number to the centralized personal data base, the transaction is processed by the CPDB, and the merchant obtains credit for the financial transaction. Since the CPDB customer can have several bank accounts and credit cards, multiple wallet numbers can be created. Each wallet number can also have a monetary limit set and can be associated with one or more financial accounts. An expiration date can be established for each wallet number. Transactions can be conducted by authorizing the CPDB to conduct the debit on the customer's account for the customer purchase and simultaneously to credit the merchant account in the CPDB. Alternatively, the merchant may obtain credit card information from the centralized personal data base and then the merchant may proceed to charge the credit card in the manner of a traditional credit card transaction. To use the CPDB electronic wallet, the customer first registers the customer's electronic wallet at the CPDB website and then provides the customer's credit card and bank account numbers. The customer also creates a wallet number associated with one or more credit or bank accounts and establishes a dollar limit for each wallet number. The customer uses only the customer's primary number and wallet number, both obtained from CPDB, for purchases online or over the phone. The merchant sends the primary number and the wallet number to the CPDB and obtains credit for the customer purchase.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
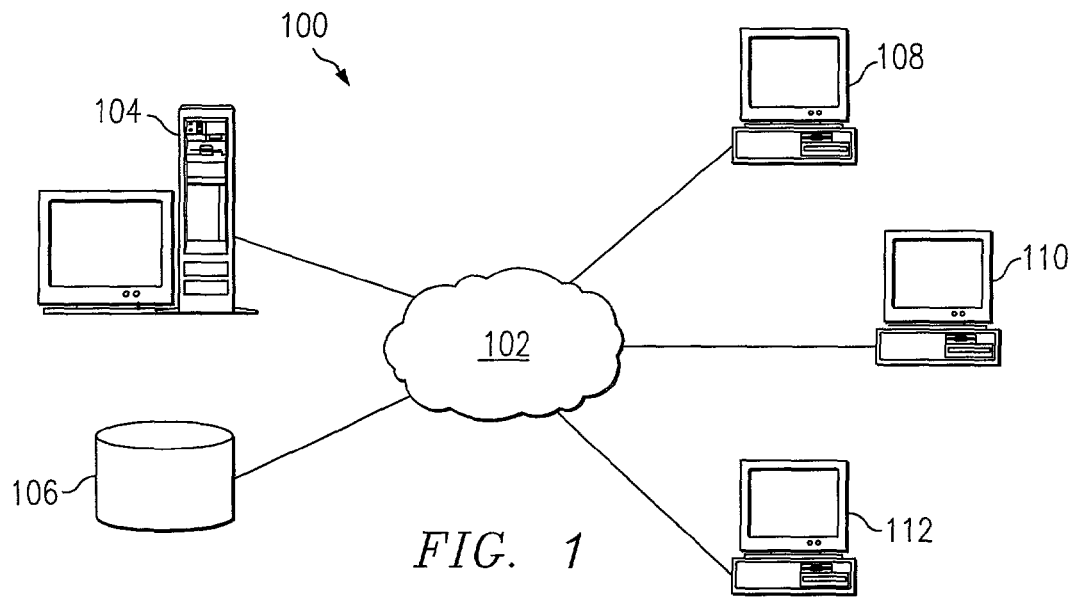
FIG. 1 is depiction of a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
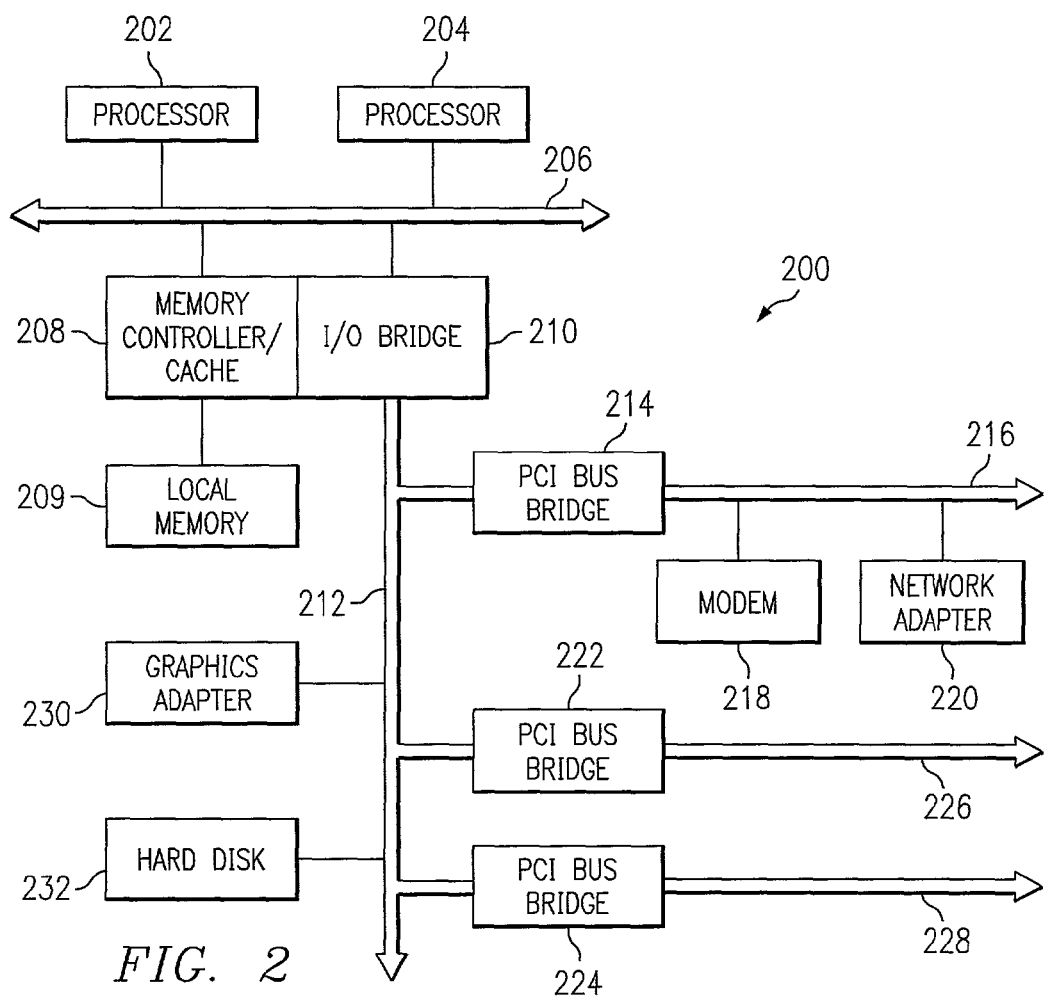
FIG. 2 is a depiction of a server computer.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
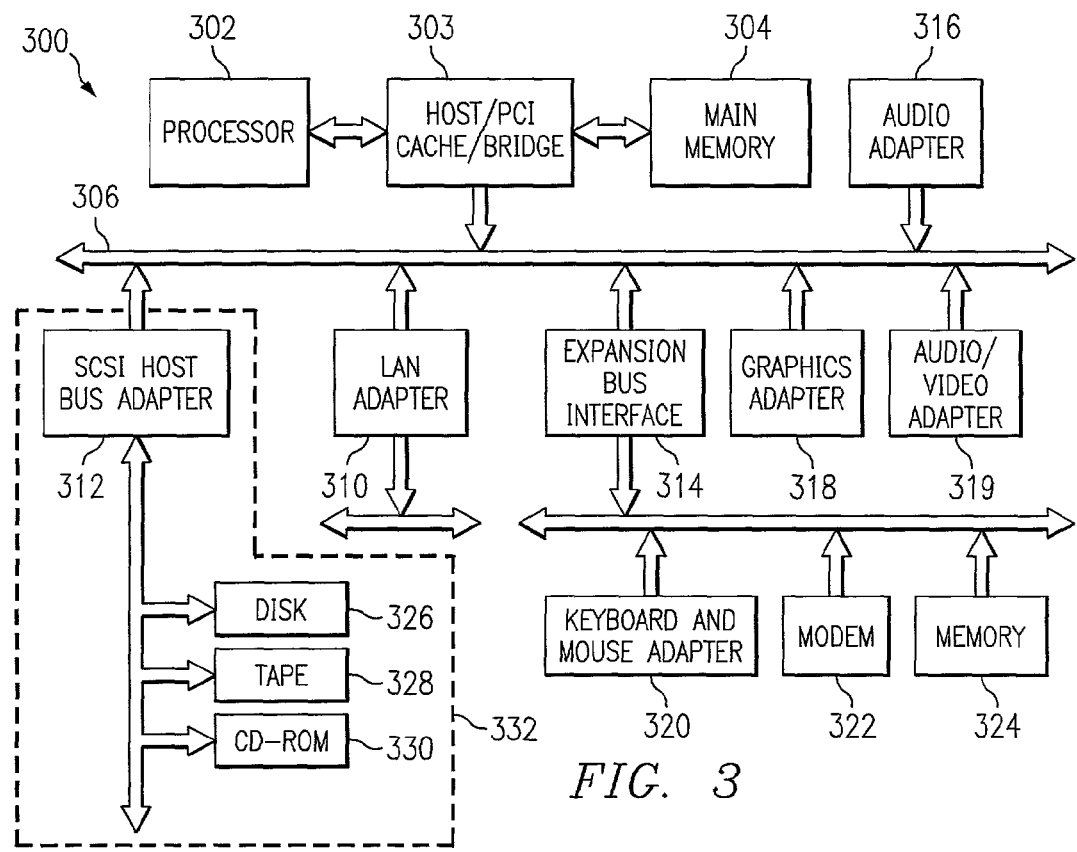
FIG. 3 is a depiction of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
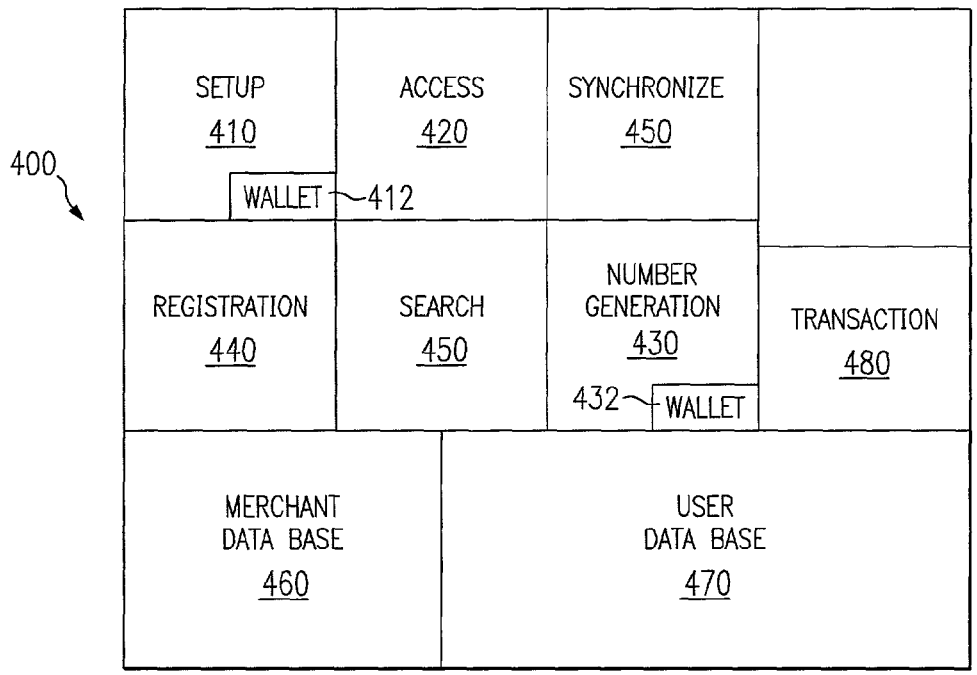
FIG. 4 is a depiction of a memory containing the components of the electronic wallet system.

FIG. 4. depicts centralized personal data base 400. As used herein, the term centralized personal data base (CPDB) means (1) a data base that may be accessed by a user having a basic and a primary number and also to any person to whom the user provides a primary and a secondary number, (2) a data base that can be accessed through the Internet from a centralized personal data base web site, and (3) that may be located in one storage area connected to one or more server computers that may be distributed in multiple storage areas each of which are connected to one or more server computers. CPDB 400 contains set-up program 410, access program 420, basic, primary and secondary number generation program 430, registration program 440, search program 450, merchant data base 460, user data base 470, and transactions program 480. Set up program 410 contains a wallet set up program 412. Number generation program 430 contains a wallet number generation program 432. Alternatively, set-up program 410, access program 420, primary and secondary number generation program 440, registration program 440, search program 450, and transactions program 480 may be located in the memory of a server computer or distributed among a plurality of computers and linked to each other and the CPDB by a network. Furthermore, one or more of the above referenced programs may be built into a web browser program or furnished as a plug-in to a web browser program.

The relationship of the wallet number to the dual number system disclosed in the CPDB patent application is that the wallet number is a special type of secondary number. Three types of numbers were used for access in the CPDB disclosure as shown in Table A.

TABLE A

| Type | User | Merchant |
|---|---|---|
| Basic | Yes | No |
| Primary | Yes | Yes |
| Secondary | No | Yes |

The user is the only person with a basic number, and therefore, although the primary number is used by both the user and those to whom the user desires to give access, the user is the only person who can access his or her account to change information. The secondary numbers are generated for those to whom access is to be given. A variety of secondary numbers can be created for different purposes. In this case, wallet number generation program 432 is located within number generation program 430 and provides numbers to support transactions carried out by transactions program 480. The wallet number is actually a secondary number that has a specialized use. In addition to authorizing elecronic transactions in conjunction with a primary number, the wallet numbers may be given an expiration date. Any number of secondary numbers may be created as needs arise for different types of information traffic and transactions. Therefore, a subcategory of secondary number types can be created and the wallet number would one of the subcategories.

Figure 5:
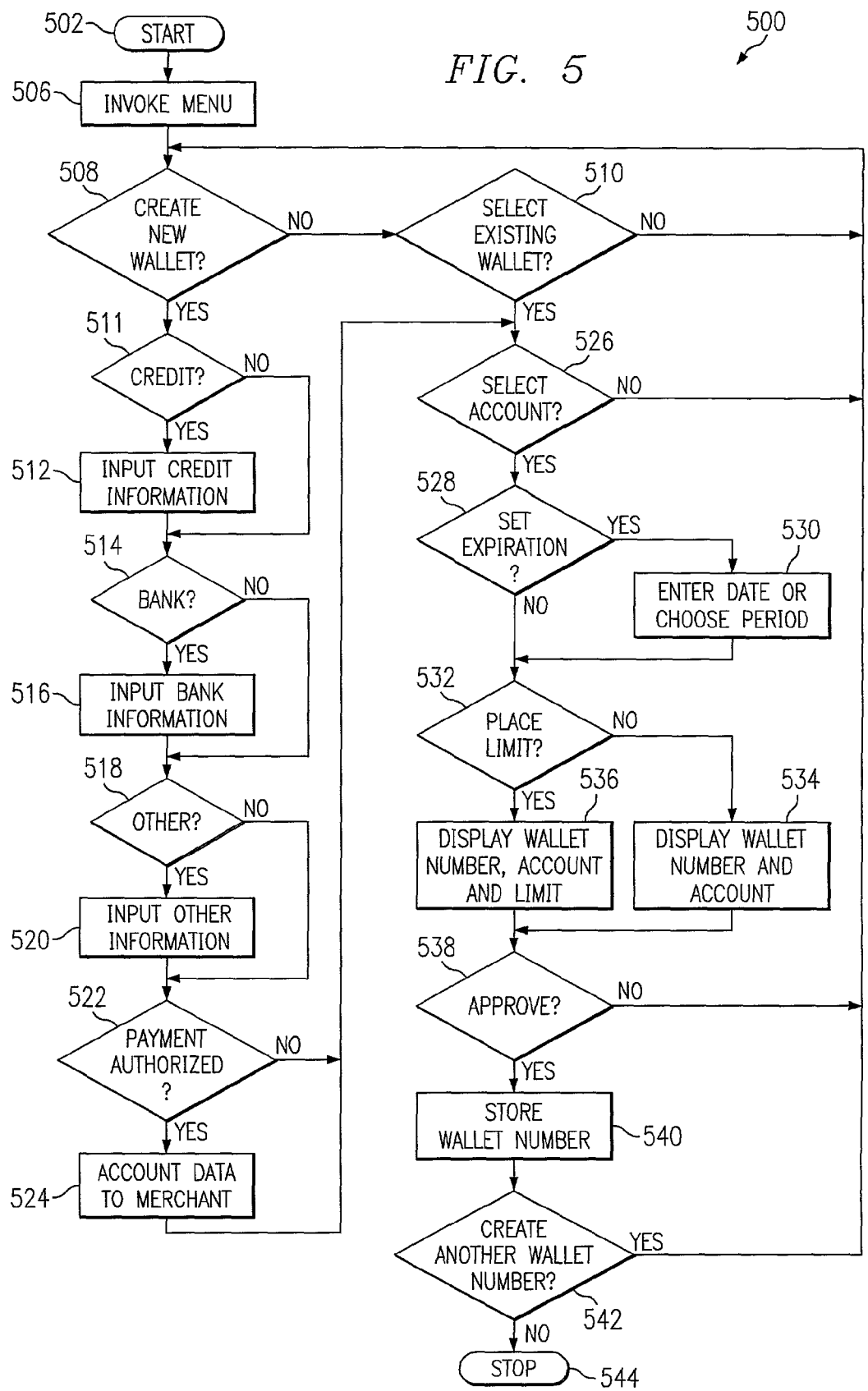
FIG. 5 is a flow chart of the wallet creation process.

FIG. 5 depicts the electronic wallet creation process 500. Electronic wallet creation process 500 begins (502) and a user invokes the centralized personal database menu (506). A determination is made as to whether the user wants to create a new wallet (508). If the user wants to create a new wallet, a determination is made whether the user wants to pay by credit (510) or other means. If the user does not want to create a new wallet, then a determination is made whether the user wants to select an existing wallet (510). If the user wants to select an existing wallet, then the process goes to step 526. If the user does not want to select an account, the process returns to step 508.

If the user wants to pay by credit (511), the user inputs the credit information (512). If the user does not want to pay by credit, a determination is made as to whether the user wants to pay from a bank account (514). If the user wants to pay by bank account, the bank account information is input (516) and the process goes to step 518. A determination is made as to whether another form of payment is to be used (520). If another form of payment is to be used, the information is input (520) and the process goes to step 522. If another form of payment is not be used, a determination is made as to whether centralized personal data base payment is authorized (522). If the centralized personal data base payment is authorized, then account information is provided to the merchant (524). If the centralized personal data base payment is not authorized, then the process goes to step 526.

If the user selects an existing account at step 526, the process goes to step 528. If the user does not select an existing account, then the process returns to step 508. A determination is made whether the user wants to set an expiration date (528). If the user wants to set an expiration date, the user selects an expiration date by either entering a date, or by choosing from a range of periods such as one month, six months, one year, etc. (530) If the user does not want to set an expiration date, the process goes to step 532. A determination is made whether the user wants to place a limit on the account (532). If the user wants to place a limit, the wallet number, account, and limit are displayed (536). If the user does not want to place a limit, the wallet number and account are displayed (534). A determination is made whether the user approves of the display (538). If the user does not approve the display, then the process returns to step 508. If the user approves the display, the wallet number is stored (540). A determination is made whether the user wants to create another wallet number (542). If the user wants to create another wallet number, the process returns to step 508. If the user does not want to create another wallet number, the process stops. (544).

Figure 6:
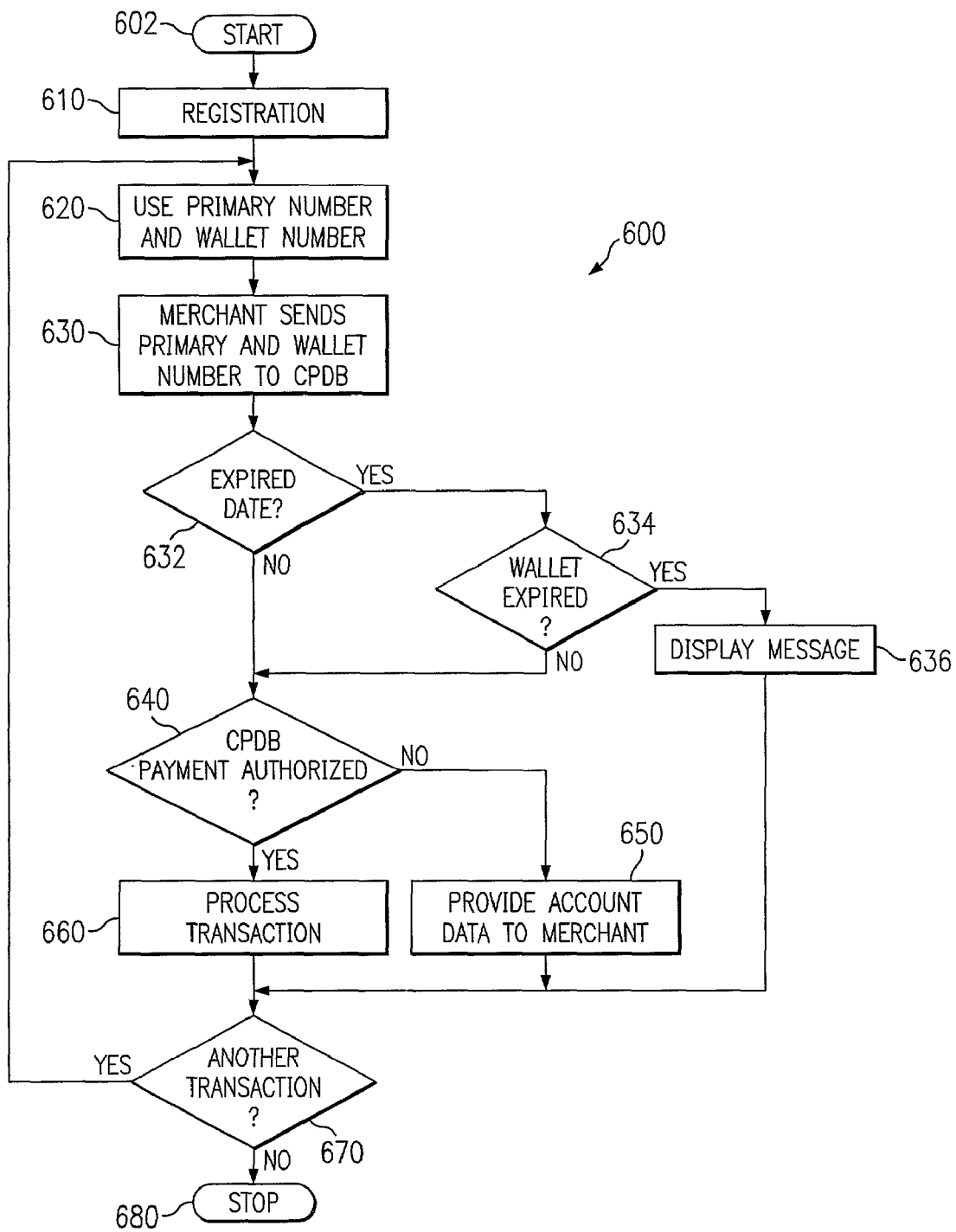
FIG. 6 is a flow chart of the transaction process.

FIG. 6 depicts a flow chart for transaction process 600. Transaction process 600 begins (602) and the user completes registration (610). The user makes a purchase using the CPDB primary number and the wallet number (620). The merchant sends the primary number and the wallet number to the centralized personal data base (630). A determination is made whether the wallet pin has an expiration date (632). If the wallet number does not have an expiration date, the process goes to step 640. If the wallet has an expiration date, a determination is made whether the date or period has passed (634). If the date or period has not passed, the process goes to step 640. If the date or period has passed a message is displayed (636) and the process goes to step 670. A determination is made whether payment by the centralized personal data base is authorized (640). If payment is authorized by the centralized personal data base, the transaction is processed (660). The transaction is processed by transactions program 480 in CPDB 400 (See FIG. 4). If the centralized personal data base payment is not authorized, the account information is provided to the merchant (650). A determination is made whether the user wants to conduct another transaction (670). If another transaction is desired, the process goes to step 620. If another transaction is not desired, the process ends (680).

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method of completing a financial transaction between a user having a payment account and a merchant having a merchant account, the method comprising:
   a) the user logging on to a centralized personal data base using a basic number and a primary number, wherein the basic number is accessible by the user but not by the merchant;
   b) the user creating an electronic wallet in the centralized personal data base by inputting a payment account number of the user's payment account to associate with the electronic wallet, a payment limit of the electronic wallet, and an expiration date of the electronic wallet;
   c) responsive to the user creating the electronic wallet, the centralized personal data base generating a wallet number associated with the electronic wallet;
   d) the user making a purchase from the merchant on a purchase date by sending the primary number and the wallet number to the merchant, wherein the purchase has a price;
   e) the merchant sending the primary number and the wallet number to the centralized personal data base; and
   f) the centralized personal data base determining whether the purchase is authorized by determining whether the purchase price exceeds the payment limit of the electronic wallet and whether the purchase date is after the expiration date, wherein the purchase is authorized when the purchase price does not exceed the payment limit and the purchase date is not after the expiration date;
   g) responsive to determining that the purchase is authorized, the centralized personal data base debiting the user's payment account for the purchase price and crediting the merchant account.

* * * * *